(12) United States Patent
Wagenblatt (10) Patent No.: US 8,438,493 B2
(45) Date of Patent: May 7, 2013

(54) PRESET NAVIGATOR

(75) Inventor: Timo Wagenblatt, Erfweiler (DE)

(73) Assignee: SAP AG, Walldorf (DE)

(*) Notice: Subject to any disclaimer, the term of this patent is extended or adjusted under 35 U.S.C. 154(b) by 164 days.

(21) Appl. No.: 12/963,164

(22) Filed: Dec. 8, 2010

(65) Prior Publication Data

US 2012/0151356 A1 Jun. 14, 2012

(51) Int. Cl.
*G06F 3/00* (2006.01)

(52) U.S. Cl.
USPC ........... 715/764; 715/968; 715/853; 715/854; 707/705

(58) Field of Classification Search .................. 715/736, 715/968, 764, 853, 854; 707/705
See application file for complete search history.

(56) References Cited

U.S. PATENT DOCUMENTS

| | | | |
|---|---|---|---|
| 5,680,563 A * | 10/1997 | Edelman | 715/835 |
| 7,149,983 B1 * | 12/2006 | Robertson et al. | 715/810 |
| 7,325,201 B2 * | 1/2008 | Ferrari et al. | 715/737 |
| 7,334,196 B2 * | 2/2008 | Suppan et al. | 715/853 |
| 7,496,583 B2 * | 2/2009 | Moore et al. | 1/1 |
| 7,555,447 B2 * | 6/2009 | Chinnappan et al. | 705/26.8 |
| 7,610,564 B1 * | 10/2009 | Pfohe et al. | 715/854 |
| 2010/0023380 A1 * | 1/2010 | Anderson | 705/10 |

* cited by examiner

*Primary Examiner* — Kieu Vu
*Assistant Examiner* — Andrew Chung
(74) *Attorney, Agent, or Firm* — Kenyon & Kenyon LLP (57) ABSTRACT

An activation arrangement may be included in one or more record selection interfaces of an enterprise computing system to activate a preset navigator interface pane for limited the quantity of records displayed in the record selection interface. The preset navigator interface pane may include filters to identify records satisfying predetermined criteria. The preset navigator interface pane may also include a tree structure depicting a hierarchical classification of the records based on certain field values in each record. The records displayed for subsequent selection in the record selection interface may be limited according to the activated filters and activated nodes in the structure.

19 Claims, 9 Drawing Sheets

▼ Products 110

Preset Navigator 150

Filters 160
☐ Focus Products 161
☐ New Products 162
☐ Discontinued Prods 163
☐ Popular Products 164

Navigator 170
☐ +200 Snacks
☐ -210 Gum
☐ -220 Candy
☐ +230 Cookies
☐ -231 Vanilla
☐ -232 Chocolate
☐ -300 Frozen Foods
☐ -400 Canned Goods ( Insert 111 ) ( Delete 112 ) ( Search 113 )

| Y/N? 121 | Product ID 122 | Description 123 | Category ID 124 |
|---|---|---|---|
| ☐ | | | |
| ☐ | | | |
| ☐ | | | |
| ☐ | | | |
| ☐ | | | |
| ☐ | | | |

Preset Navigator 130     ( OK )   ( Cancel )

FIG. 3

▼ Products 110

| Preset Navigator 150 |
|---|
| Filters 160 |
| ☑ Focus Products 161 |
| ☐ New Products 162 |
| ☐ Discontinued Prods 163 |
| ☐ Popular Products 164 |
| Navigator 170 |
| ☐ +200 Snacks |
|    -210 Gum |
|    -220 Candy |
|    +230 Cookies |
|       -231 Vanilla |
|       -232 Chocolate |
| ☐ -300 Frozen Foods |
| ☐ -400 Canned Goods |

[ Insert 111 ] [ Delete 112 ] [ Search 113 ] [ All/None 114 ]

| Y/N? 121 | Product ID 122 | Description 123 | CategoryID 124 |
|---|---|---|---|
| ☐ | GP4OZ | GP Candy Bar – 4oz | 0223.6586.12 |
| ☐ | BGCH3 | Big Choco Cookies – 3 pack | 0232.5698.36 |
| ☐ | FZ12FS | Frozen Fish Fillets – 12 oz | 0356.4187.14 |
| ☐ | | | |
| ☐ | | | |
| ☐ | | | |

Preset Navigator 130  [ OK ]  [ Cancel ]

FIG. 4

▼ Products 110

Preset Navigator 150

Filters 160

☑ Focus Products 161
☐ New Products 162
☐ Discontinued Prods 163
☐ Popular Products 164

Navigator 170

☐ +200 Snacks
☐ -210 Gum
☐ -220 Candy
☑ +230 Cookies
☐ -231 Vanilla
☐ -232 Chocolate
☐ -300 Frozen Foods
☐ -400 Canned Goods

[Insert 111] [Delete 112] [Search 113] [All/None 114]

| Y/N? 121 | Product ID 122 | Description 123 | Category ID 124 |
|---|---|---|---|
| ☐ | BGCH3 | Big Choco Cookies -- 3 pack | 0232.5698.36 |
| ☐ | | | |
| ☐ | | | |
| ☐ | | | |
| ☐ | | | |
| ☐ | | | |

Preset Navigator 130    [OK]    [Cancel]

FIG. 5

▼ Products 110

Preset Navigator 150

Filters 160

☑ Focus Products 161
☐ New Products 162
☐ Discontinued Prods 163
☐ Popular Products 164

Navigator 170

☐ +200 Snacks
☐ -210 Gum
☐ -220 Candy
☐ +230 Cookies
☐ -231 Vanilla
☐ -232 Chocolate
☒ -300 Frozen Foods
☐ -400 Canned Goods ( Insert 111 ) ( Delete 112 ) ( Search 113 ) ( All/None 114 )   _ □ X

| Y/N? 121 | Product ID 122 | Description 123 | Category ID 124 |
|---|---|---|---|
| ☐ | GP4OZ | GP Candy Bar- 4oz | 0223.6586.12 |
| ☐ | BGCH3 | Big Choco Cookies -- 3 pack | 0232.5698.36 |
| ☐ | | | |
| ☐ | | | |
| ☐ | | | |
| ☐ | | | |

Preset Navigator 130   ( OK )   ( Cancel )

FIG. 6

▼ Products 110

Preset Navigator 150

Filters 160
- ☐ Focus Products 161
- ☐ New Products 162
- ☐ Discontinued Prods 163
- ☐ Popular Products 164

Navigator 170
- ☐ +200 Snacks
- ☐ -210 Gum
- ☒ -220 Candy
- ☐ +230 Cookies
- ☐ -231 Vanilla
- ☒ -232 Chocolate
- ☐ -300 Frozen Foods
- ☐ -400 Canned Goods

[Insert 111] [Delete 112] [Search 113]

| Y/N? 121 | Product ID 122 | Description 123 | Category ID 124 |
|---|---|---|---|
| ☐ | GBL6O | Gobblers - 6 oz Packs | 0226.5417.10 |
| ☐ | YUM12 | Yummies - 12 Packs | 0227.1457.10 |
| ☐ | JL1A2 | Jellies -- Multi Color Packs | 0221.0203.17 |
| ☐ | BSN123 | Biters -- Variety Packs | 0229.1201.16 |
| ☐ | BGCH3 | Big Choco Cookies -- 3 pack | 0232.5698.36 |
| ☐ | WMCM2 | White Choc. Macadamia | 0232.6487.14 |
| ☐ | DCFI32 | Dark Choc. Filled Cookies | 0232.6490.36 |

Preset Navigator 130   [OK]   [Cancel]

FIG. 7

Search: Products

Search Criteria 710

| | | |
|---|---|---|
| Product ID | is | 122 |
| Product Description | starts with | star |
| Category ID | is | 124 |
| Category Description | is | |

Maximum Number of Results: 100

Save Search As: 720 ☐ Save

[ Search ] [ Clear ]

PRESET NAVIGATOR

BACKGROUND

Organizations often use enterprise computing systems to facilitate business processes and manage organizational data. Larger organizations may have vast amounts of data relating to products offered for sale by the organization, customers purchasing the products, employees of the organization, sales orders of the products, production plans, and so on. For example, a larger organization may have thousands of products for sale, thousands of different customers purchasing the products, and thousand of employees.

Different computing processes may require a user to identify one or more of these records in a particular transaction. For example, when completing a sales order form, a user may be asked to identify a particular product being ordered. To identify products being ordered, in first instances, the user may directly enter a product identifier if the identifier is known by the user. In second instances, the product may be preselected depending on the context in which the sales order form was created. For example, if the sales order form was triggered in response to a prior query of a particular product, then the queried product may be preselected as the product being ordered.

In third instances a product may be selected from a drop-down list box populated with products selected in the past. Finally, in fourth instances, queries may be run to select products to be added. The usefulness of the each of these instances may be limited when a user wants to add multiple record values to a table, such as multiple products to a sales order.

The first instances, in which the user directly enters a record identifier, may be cumbersome and impractical for entering multiple records, especially if some of the record identifiers are unknown. The second instances, in which the product is preselected, may be impractical for the selection of multiple records and also if the records to be selected were not preselected. The third instances may also be impractical if the records to be selected were not selected in the past and included in the drop-down list box. The fourth instances of running queries to identify products may be impractical if the queries return a large result set requiring time consuming manual screening by the user for a record to be selected or if multiple queries must be executed to select different records.

There is thus a need for a simplified multiple record selection interface that can be easily integrated into different existing record selection interfaces of enterprise computing systems.

DETAILED DESCRIPTION

In an embodiment of the invention, an activation arrangement may be included in one or more record selection interfaces of an enterprise computing system that contains a record selection pane listing records from which a user may select individual records to be included in a table. Upon activating the activation arrangement, a preset navigator interface pane may be instantiated on the screen in the vicinity of the record selection pane.

The preset navigator pane may be subdivided into a filtering area and a navigation area. The filtering area may include one or more filters to narrow the displayed records shown in the record selection pane based on predetermined criteria associated with each filter. This may reduce clutter and make it easier for the user to find and select particular records. The filters may be activated or deactivated and the records displayed in the record selection pane may be updated accordingly. In some instances, a user may change the predetermined criteria associated with an existing filter, delete an existing filter, or add a new filter with new criteria.

The navigation area may include a tree structure depicting a hierarchical categorization of the data records in the record selection pane. The categorization shown may vary depending on the records to be selected in the record selection interface. For example, product records may be categorized by product type while customer records may be categorized based on geography. The categorization displayed in the navigation area may be obtained data in at least one field of each record in the enterprise systems. For example, each product record may have a product category field specifying the product type. Similarly, each customer record may have state, country, and continent fields identifying the location of the customer.

Once the at least one field containing the categorizing information is identified, the preset navigator system may read the identified fields from each record eligible for display in the record selection pane and automatically generate a hierarchical tree structure displayed in the navigation area by combining the parental relationship information from each of the records to be displayed. In other embodiments, the hierarchical tree structure may have already been created by and used in the enterprise system. In these cases, the preset navigator system may read the existing tree structure from the enterprise system and display the hierarchy in the navigation pane.

The preset navigator system may also compare the read identified fields from each record to the existing enterprise system tree structure and distinguish those nodes in the structure corresponding to the read identified fields from those that do not. In some instances, if there are categorization nodes in the existing enterprise system tree structure that do not relate to any of the records displayed in the record selection pane, those unrelated nodes may not be displayed in the navigation pane, or they may be grayed out or otherwise differentiated to distinguish them from nodes affiliated with at least one displayed record.

A user may activate or deactivate nodes in the tree structure displayed in the navigation pane. The navigation pane may be configured so that activation of a top level node in the tree structure may cause the structure to expand and display child nodes of the activated node. Similarly, deactivating the top level node may cause the structure to contract and hide the child nodes.

The navigation pane may also be configured so that activating a lower level node in the tree structure may cause the record selection pane to only display those records with identified fields matching the selected node. Deactivating the lower level node may remove the records with identified fields matching the deactivated node from the record selection pane. In some instances, multiple lower level nodes may be activate simultaneously, in which case any records with identified fields matching any of active nodes may be displayed.

Filters and nodes may be activated interchangeably to further limit the records displayed in the record selection pane for eventual selection. For example, if a filter is initially activated, then the record criteria associated with the activated filter may be applied to each of the records. Those records satisfying the filter criteria may be initially displayed in the record selection pane. If a user then activates a lower level node in the navigation area, then, of the records initially displayed in the record selection pane responsive to the filter criteria, only those with identified fields matching the activated node will continue to be displayed in the record selection window. If a user then activates another filter, the displayed records may be further pared down to those also satisfying the second activated filter criteria as well.

The record selection pane may also include a demarcation arrangement enabling individual records displayed in the record selection pane to be designated for inclusion in and/or exclusion from a results table. The demarcation arrangement may include a default setting in which displayed records in the record selection pane are marked by default for inclusion in the results table and a user must individual designate those displayed records to be excluded from the results table. Alternatively, the default setting may exclude displayed records from the results table and only those individual selected records may be designated for inclusion. The default setting may also revert to designating for inclusion previously selected records in an earlier iteration of the record selection process.

The demarcation arrangement may also enable a group of records to be designated for inclusion or exclusion in the results table. A group may include all records currently displayed in the record selection pane. A group may also include those records responsive to an applied filter. A group may also include those records having identified fields associated with an activated node in the navigation area. Individual records within a group may be collectively designated for inclusion or exclusion in the results table by designating the group itself instead of the individual records in the group.

Figure 1:
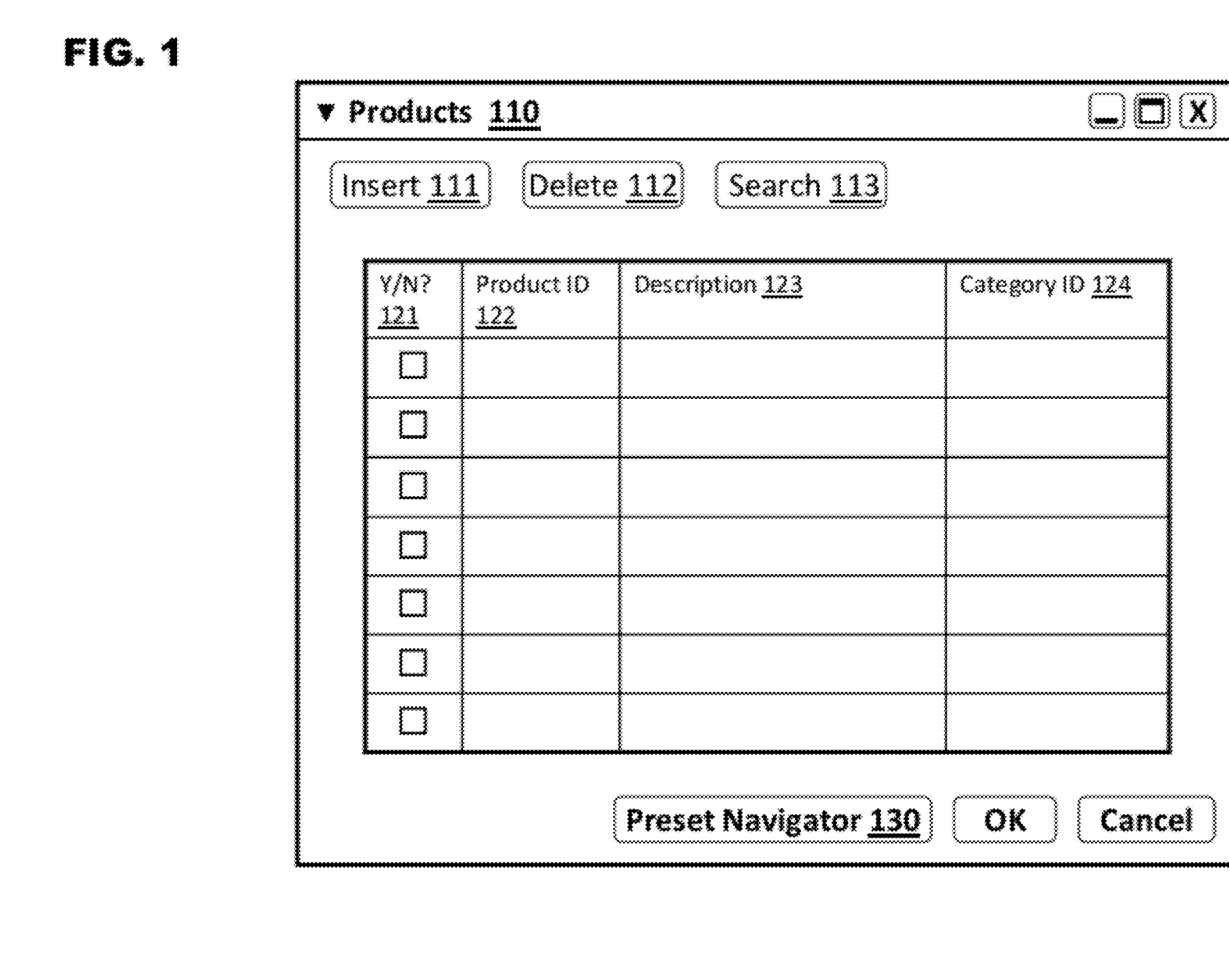
FIG. 1 shows an exemplary interface for selecting individual records in an embodiment of the invention.

FIG. 1 shows an exemplary interface for selecting individual records, in this case individual product records, from a group of records. The interface may be instantiated in response to a prompt from an application to select particular records. The records may be any of data records, including, for example, customer records, product records, employee records, or other types of records. The records may be selected for any purpose, such as to identify records for further processing, to identify records to be stored, and so on.

The interface shown is a product selection interface 110. Each product record appearing in the interface 110 may include a product identifier 122, product description 123, and product category identifier 124. A demarcation arrangement, such as Yes/No boxes 121, may also be included to select particular records from among those displayed. Insert 111 and delete 112 buttons may be use to add or remove records from the interface. Search 113 button may be used to instantiate an interface for inputting a query to limit the resulting records displayed in the product selection interface 110.

Aside from using the insert 111 and search 113 buttons to add records displayed in the interface 110, an activation arrangement may also be included in the interface 110 to instantiate a preset navigator interface pane providing alternative options for displaying particular records in the product selection interface 110. In the example of FIG. 1, a preset navigator 130 button is shown as the activation arrangement, through activation arrangements, such as hot keys, may be used in other embodiments.

Figure 2:
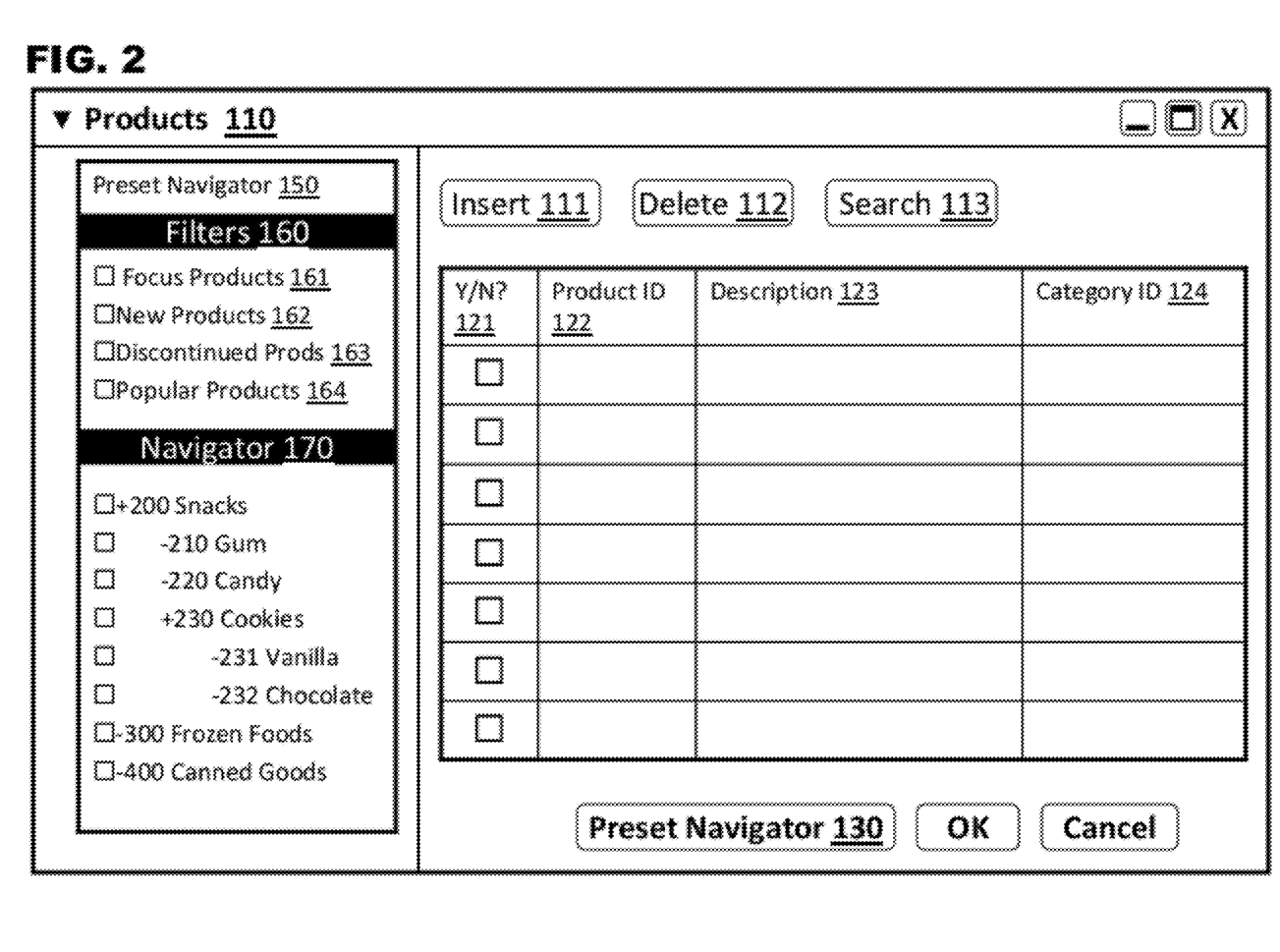
FIG. 2 shows exemplary changes to the product selection interface after activating the activation arrangement in an embodiment.

FIG. 2 shows exemplary changes to the product selection interface 110 after activating the activation arrangement. In this example, a preset navigator pane 150 may be added to the left side of the product selection interface 110. The preset navigator pane 150 may include a filter area 150 with one or more filters, such as focus products 161 filter, new products 162 filter, discontinued products 163 filter, and popular products 164 filter. The preset navigator pane 150 may also include a navigator area 170 displaying a tree structure of properties of records that may be displayed in product selection interface 110.

Since the example in FIG. 2 relates to a product selection interface, the navigator area 170 may display a tree structure for the categories of products (such as snacks 200, gum 210, candy 220, and so on) eligible for display in the product selection interface 110. Eligible products may be products that the user is authorized to access. For example, if a first user is assigned to a food products group and a second user is assigned to a consumer appliance group, then the first user may only be able to access food products, while the second may only access consumer appliance products. Thus, the product selection interface 110 and the navigator area 170 tree structure may only show products and categories corresponding to those that a respective user is authorized to access.

Eligible products may also include products responsive to the prompt initiating the product selection interface 110. For example, if the prompt instantiated the product selection interface 110 to identify particular food products ordered by a customer, then the eligible products may only include food products and the categories displayed in the tree structure may only include food categories.

Figure 3:
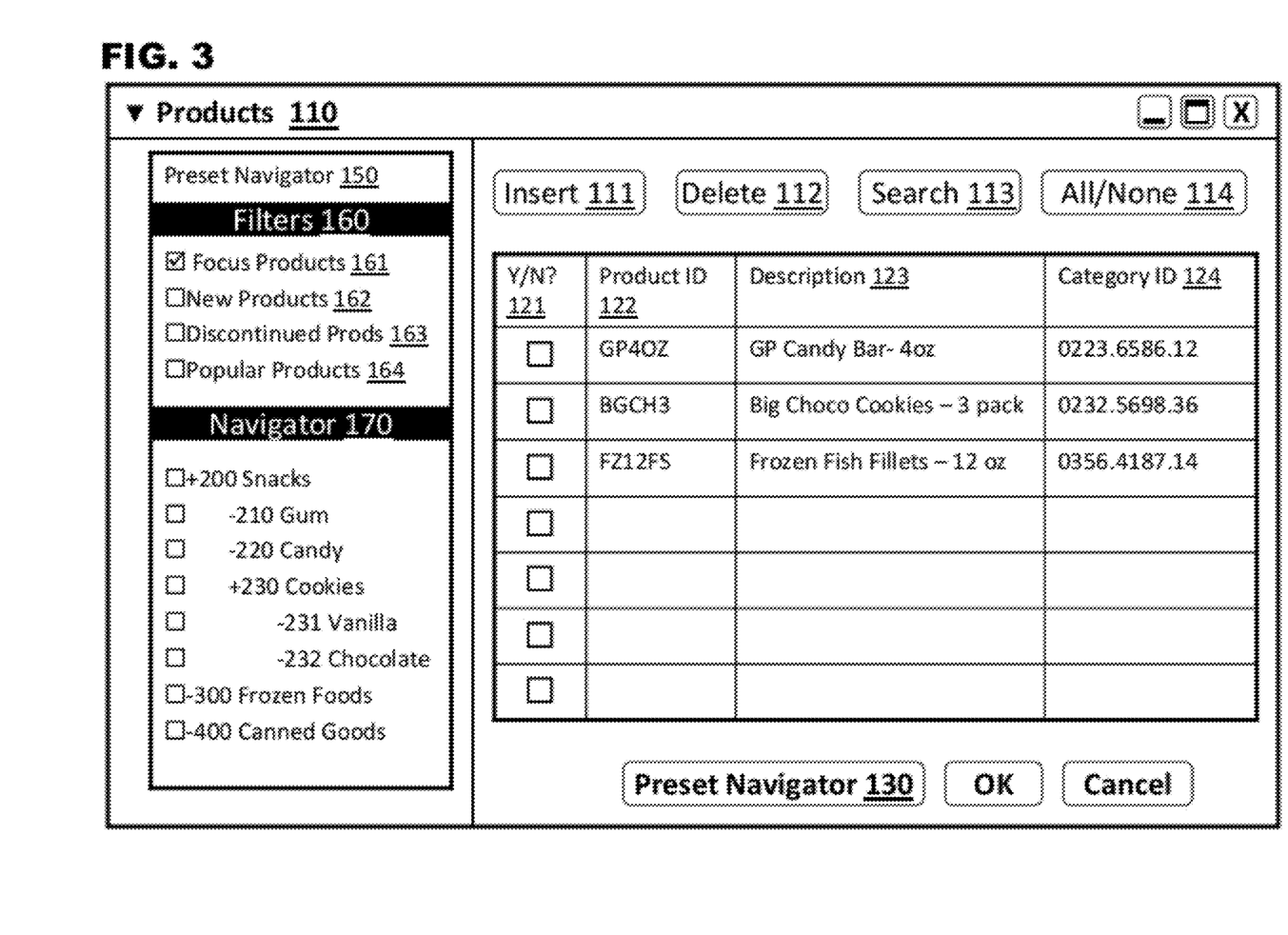
FIG. 3 shows a result of activating a filter in an embodiment.

FIG. 3 shows the result of an activation of a focus products filter 161 in the filter area 160. A filter may include one or more saved criteria to be applied to records to limit the records displayed in the product selection interface 110. Because filters delineate specific criteria of records displayed in the interface, such as product selection interface 110, the resulting records displayed in the interface that satisfy the filter criteria may vary as the records are changed. For example, a product record with a field designating the record as a new record may initially be included when applying a new product filter 162. However, if the field designation in the record is subsequently changed so that the product record is no longer designated as new, then if the filter is reapplied, the record may not be included in the result. To ensure that the most accurate results are displayed, the saved criteria associated with a filter may be reapplied to eligible records each time the filter may be activated.

In the case of the focus products filter 161, the saved criteria may only return those product records with fields (not shown) indicating that the products are of high interest or a particular focus. In this instance, if the user is only authorized to access food products, then the resulting food product records that are designed as focus products may only be the three records shown—GP Candy Bar, Big Choco Cookies, and Frozen Fish Fillets. The demarcation arrangement, with selectable Yes/No boxes 121, may be used to select those records, out of the three displayed, that are responsive and should be included in any result set.

Figure 4:
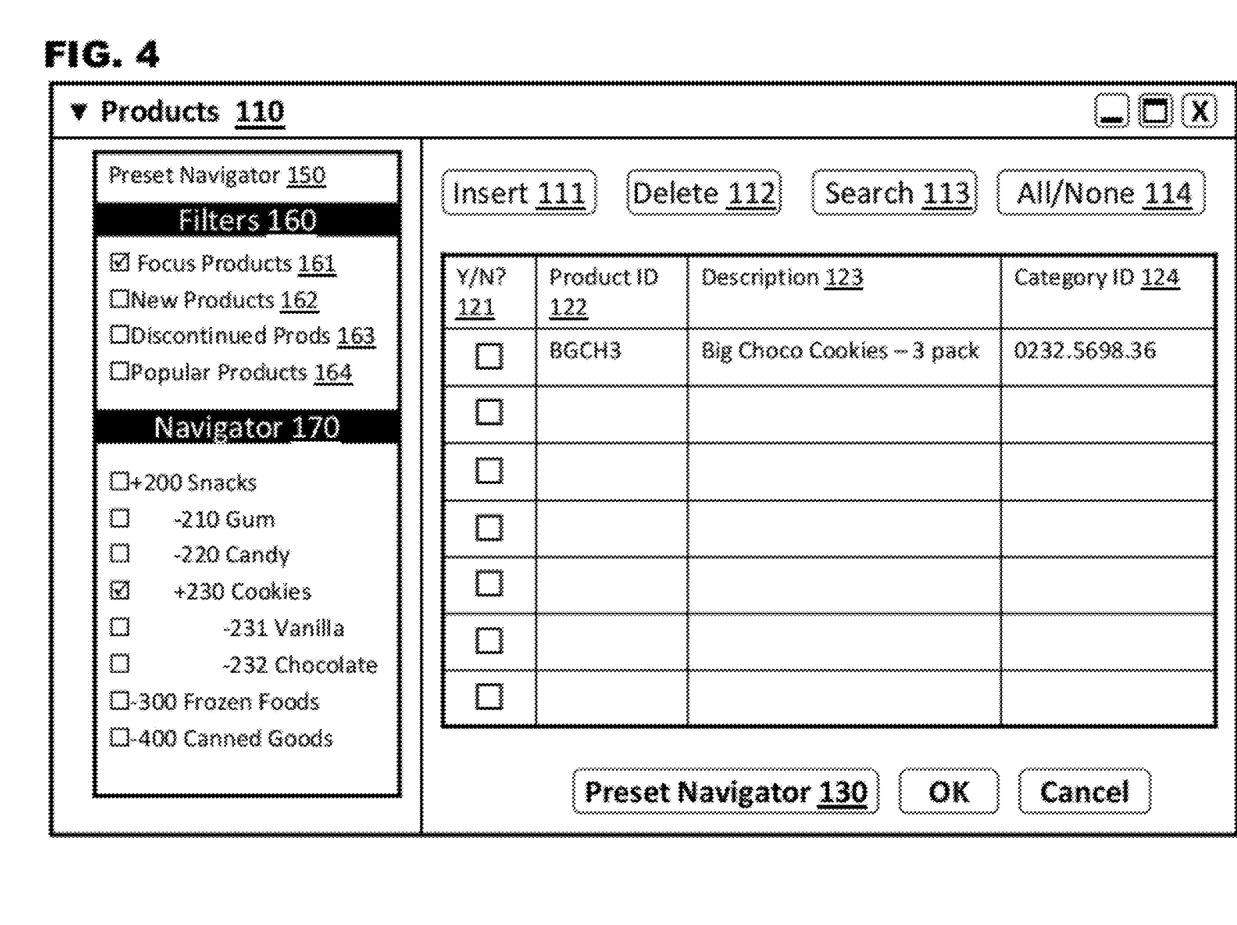
FIG. 4 shows a result of activating a node in the tree structure after activating a filter in an embodiment.

FIG. 4 shows a result of activating a node in the navigator area 170 tree structure after activating a filter in the filter area 160. In this figure, it is assumed that after the focus products filter 161 is initially activated, the three products satisfying the filter criteria shown in the product selection interface 110 of FIG. 3 are displayed. If the cookies node 230 in the navigator area 170 tree structure is then activated, then the results shown in the product selection interface may be further limited to those records with a category ID field 124 corresponding to the category cookies 230, including subcategories vanilla 231 and chocolate 232. Since the only product record in the cookies 230 category is the Big Choco Cookies product record, this is the only record responsive to both activated elements in the preset navigator pane 150.

Figure 5:
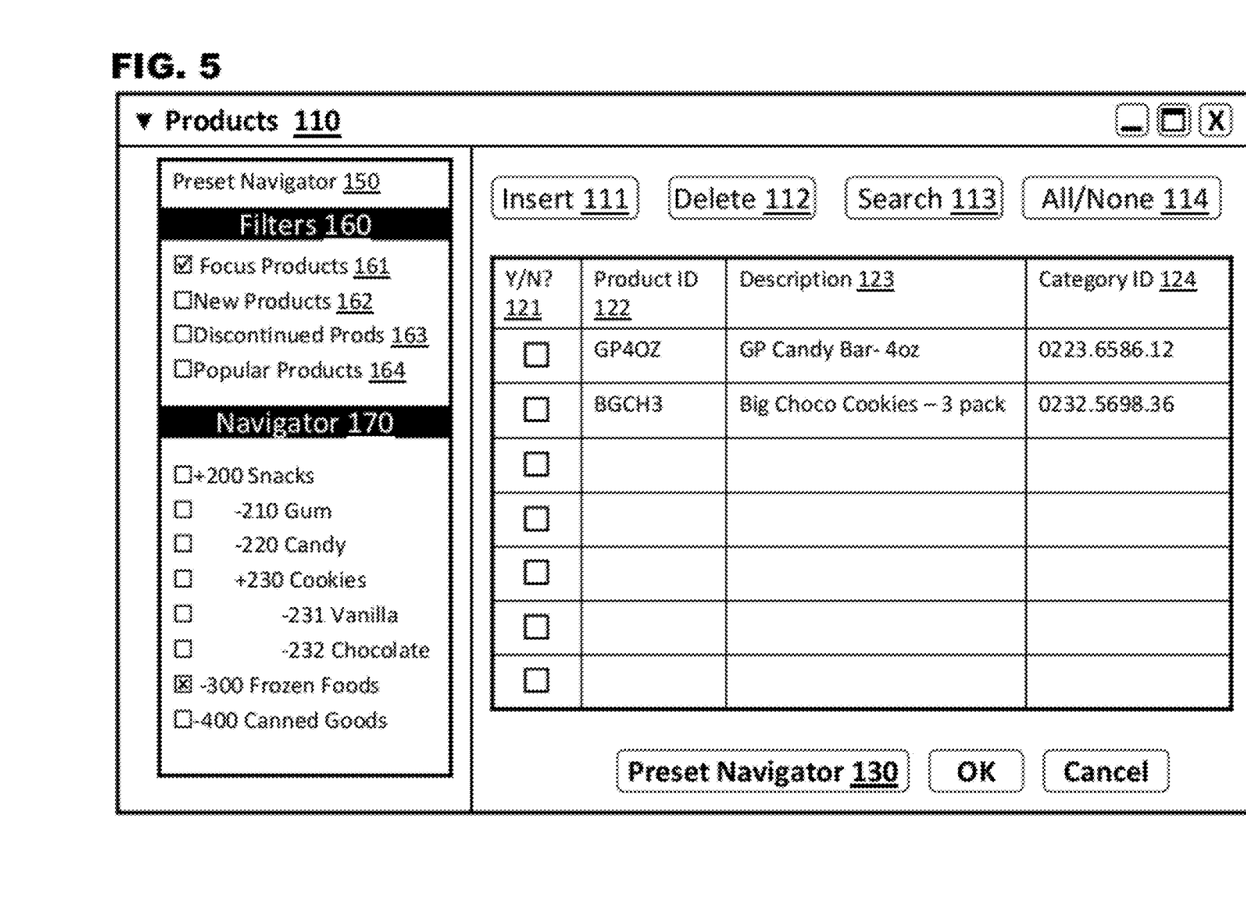
FIG. 5 shows a result of deactivating a node in the tree structure in an embodiment.

FIG. 5 shows a result of deactivating a node in the navigator area 170 tree structure after activating a filter in the filter area 160. In this figure, it is assumed that after the focus products filter 161 is initially activated, the three products satisfying the filter criteria shown in the product selection interface 110 of FIG. 3 are displayed. If the frozen food node 300 in the navigator area 170 tree structure is then marked for exclusion or deselection as indicated by the X in the box preceding the node, then the results shown in the product selection interface may be further limited to those records not including a category ID field 124 corresponding to the category frozen foods 300, including any subcategories therein. Since the only product record in the frozen foods 300 category is the Frozen Fish Fillets, this is the only record from the three results that may be excluded from product selection interface 110.

Figure 6:
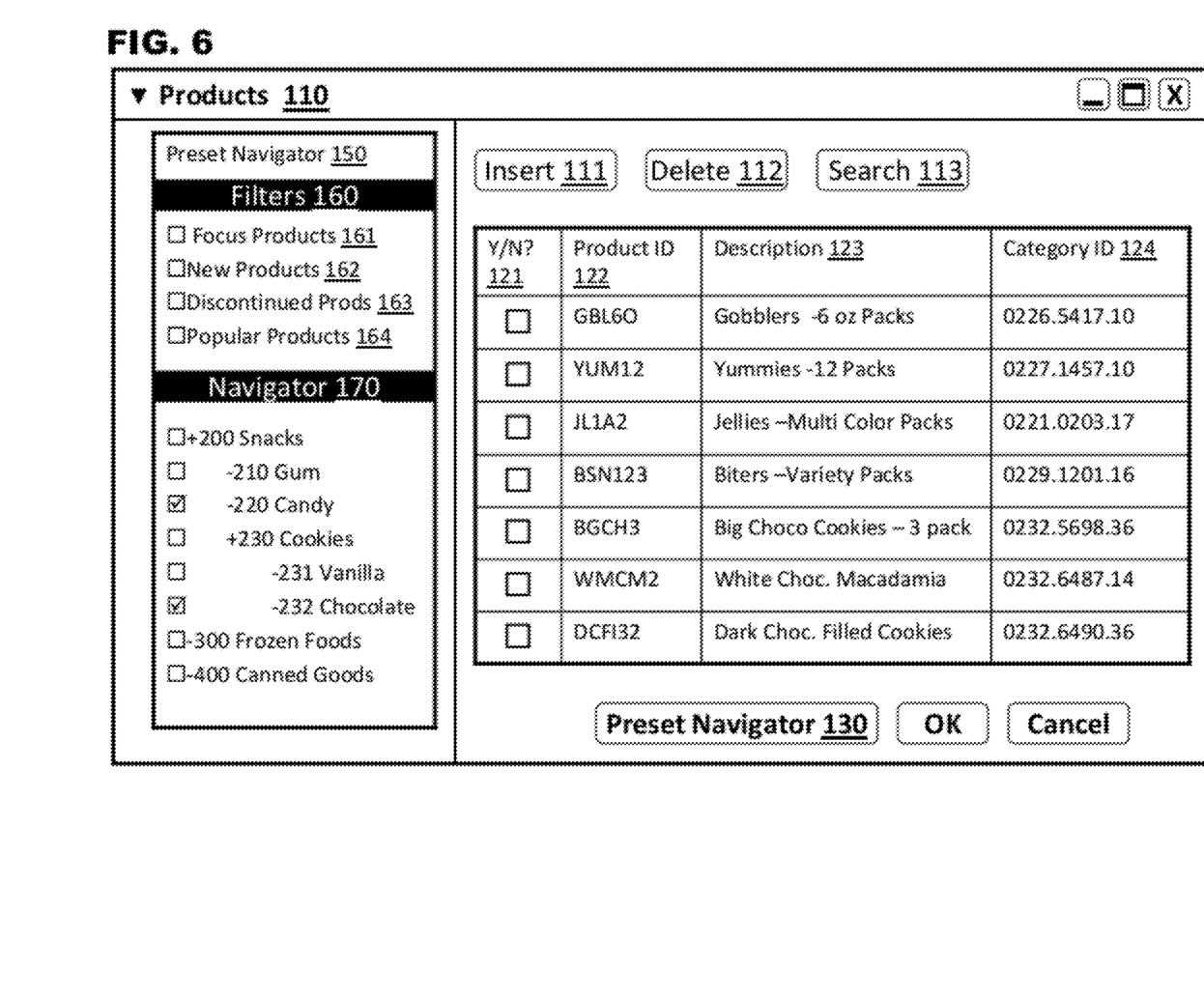
FIG. 6 shows a result of activating two nodes in the tree structure in an embodiment.

FIG. 6 shows a result of activating two nodes in the navigator area 170 tree structure. In this case, if both the candy node 220 and chocolate cookie node 232 are both activated then the product records displayed in the product selection interface 110 may be limited to those with a category identifier field 124 corresponding to the category of either candy 220 or chocolate cookies 230. In this example, the product records in the candy category 220 may include Gobblers, Yummies, Jellies, Biters, and others not shown in the interface 110 but that may be visible by scrolling, switching to a next screen, or other actions to change the visible records in the interface response to the activated nodes. Similarly, the product records in the chocolate cookie category 232 may include Big Choco Cookies, White Chocolate Macadamia Cookies, and Dark Chocolate Filled Cookies, and others not shown in the interface 110 but that may be visible by scrolling, switching to a next screen, or other actions to change the visible records in the interface response to the activated nodes.

Figure 7:
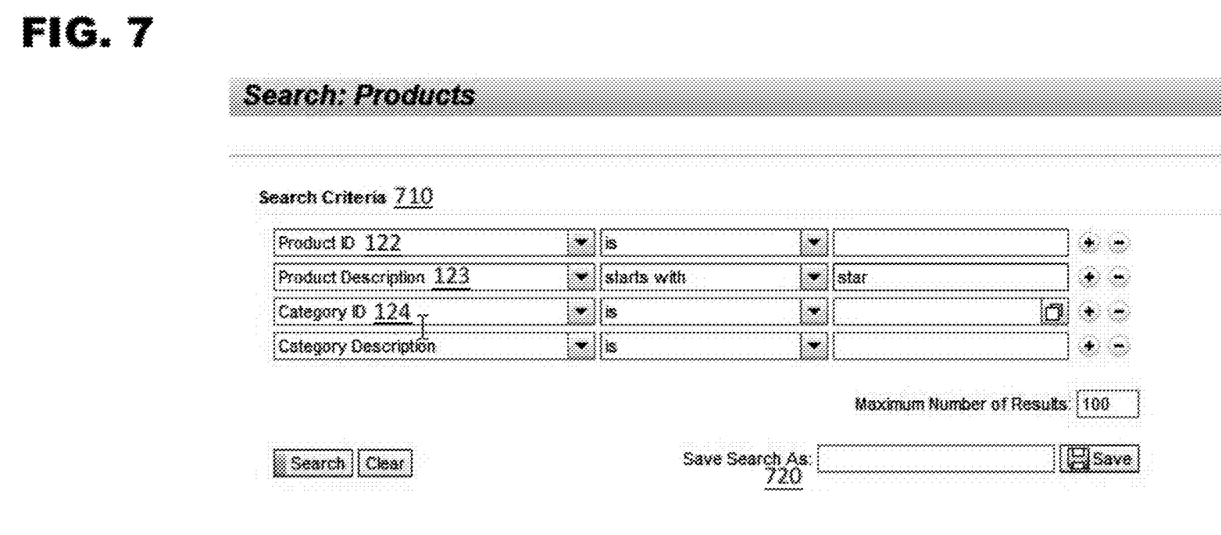
FIG. 7 shows an exemplary interface for creating or changing filter criteria in an embodiment.
Figure 8:
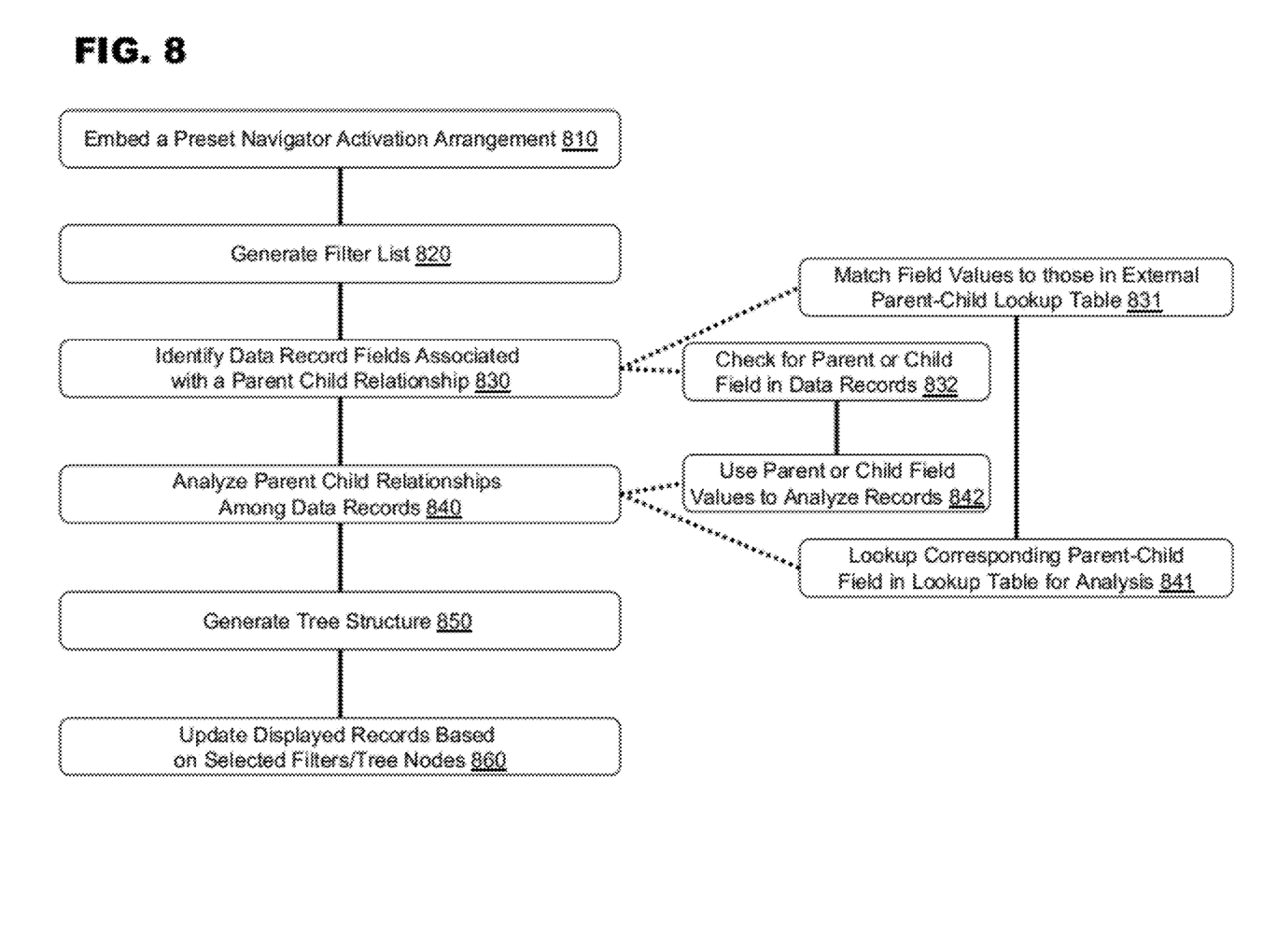
FIG. 8 shows an exemplary method in an embodiment of the invention.

FIG. 7 shows an exemplary interface for creating or changing filter criteria. In this interface, one or more filter search criteria 710 may be specified or changed for a particular filter. One or more criteria for different fields in a record may be specified. The criteria may include certain values in the product ID 122, description 123, or category ID 124 fields of a record. The criteria may also exclude values of fields or specify other conditions. The criteria may, for example, require that a certain field contains a certain value in one instance or exclude a certain value in another instance. A maximum number of results may also be specified to prevent information overload in the event that there are a great number of responsive records. The search criteria may be saved 720, and the name of the saved criteria may be the filter name that appears in the filter area 160 of the preset navigator pane 150. include restrictions on values FIG. 8 shows an exemplary method in an embodiment of the invention. In box 810, a preset navigator activation arrangement may be embedded in a record selection interface to enable activation of a preset navigation pane to focus records displayed in the interface for subsequent selection. In box 820, a list of filters may be generated that are associated with records to be displayed in the record selection interface. Each filter in the list may have search criteria relating to data fields of records to be displayed in the records selection interface. Those filters with search criteria that do not limit or otherwise relate to the records displayed in the records selection interface may be excluded from the list.

In box 830, the data fields of records to be displayed in the record selection interface may be scanned to identify those data fields used to define a parent-child relationship between different records. This identification may occur in various ways depending on the configuration. Two identification methods are described in boxes 831 and 832.

In box 831, data fields and/or data field values of records to be displayed in the records selection interface may be compared to those in an external lookup table defining parent-child relationships according to data fields and/or data field values. After matching fields and/or field values have been identified in the lookup table, in box 841 the corresponding parent-child relationship specified in the table for the match may be used in the analysis in box 840 to determine the relationship between each of the records eligible for displayed.

In an embodiment, each of the data records may include a parent data field and/or a child data field identifying a parent or child relationship between the data record and another record of the organization. In box 832, the fields of the data records eligible for display in the records selection interface may be checked for designated parent or child fields. In boxes 840 and 842, the information in these parent and/or child fields of eligible records may be analyzed and compared to determine a relationship between each of the eligible records.

Once the relationship between the records has been determined, in box 850, a tree structure may be generated to visually show the hierarchical parental relationship structure of the different data records. The tree structure may be displayed in the navigator area of the preset navigator pane.

In box 860, the data records displayed in the records selection interface may be updated to show those records responsive to activated filters and/or parental tree structure nodes. For example, if a filter in the filter list generated in box 820 is activated, then the search criteria associated with the activated filter may be applied to the records eligible for display in the records selection interface to limit the records displayed to those satisfying the search criteria. The records displayed in the record selection interface may then be updated to show only those satisfying the search criteria of the activated filter.

Similarly, if a node in the tree structure is activated, then the records displayed in the records selection interface may be updated to show only those records with fields encompassed within the activated node or any subordinate nodes.

Figure 9:
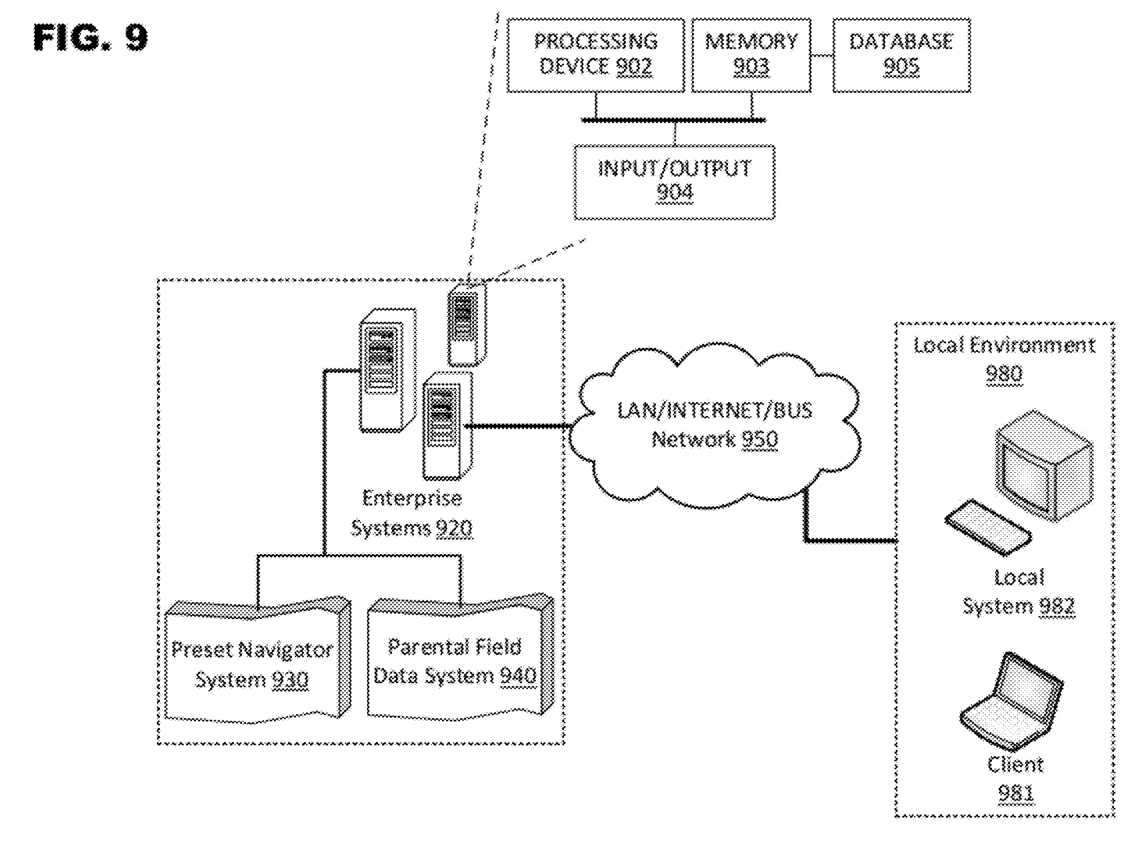
FIG. 9 shows an exemplary architecture of systems in an embodiment of the invention.

FIG. 9 shows an exemplary architecture of systems in an embodiment of the invention. Preset navigator system 930, which may contain the components and tools to instantiate preset navigation panes and the requisite functionality within those panes, may be embedded into one or more enterprise systems 920 of an organization through a connectivity. A connectivity is a communications bus, communications network, link, or other system that that transfers data between computer components inside a computer system or between computer systems. The preset navigator system 930 may also be a separate system linked to the enterprise systems of the organization through a connectivity, which may include communications network 950. The preset navigator system 930 may be linked to the parental field data system 940, which may be used to store and/or manage the external parent-child lookup tables. The parental field data system 940 may be integrated into the enterprise systems 920, or the parental field data system 940 may be a separate system linked to the preset navigator system 930 and/or the enterprise systems 920. The enterprise systems 920 may be connected to different local environments 980, local systems 982, and/or clients 981, through communications network 950. Network 950 may include a LAN, WAN, VPN, Communications Bus, the Internet, or other communications medium.

Each of the systems and clients in FIG. 9 may contain a processing device 902, memory device 903 containing a database 905, and an input/output interface 904, all of which may be interconnected via a system bus. In various embodiments, each of the systems 920, 930, 940, 982, and 981 may have an architecture with modular hardware and/or software systems that include additional and/or different systems communicating through one or more networks. The modular design may enable a business to add, exchange, and upgrade systems, including using systems from different vendors in some embodiments. Because of the highly customized nature of these systems, different embodiments may have different types, quantities, and configurations of systems depending on the environment and organizational demands.

In an embodiment, memory device 903 may contain different components for retrieving, presenting, changing, and saving data. Memory device 903 may include a variety of memory devices, for example, Dynamic Random Access Memory (DRAM), Static RAM (SRAM), flash memory, cache memory, and other memory devices. Additionally, for example, memory device 903 and processing device(s) 902 may be distributed across several different computers that collectively comprise a system.

Processing device 902 may perform computation and control functions of a system and comprises a suitable central processing unit (CPU). Processing device 902 may comprise a single integrated circuit, such as a microprocessing device, or may comprise any suitable number of integrated circuit devices and/or circuit boards working in cooperation to accomplish the functions of a processing device. Processing device 902 may execute computer programs, such as object-oriented computer programs, within memory device 903.

The foregoing description has been presented for purposes of illustration and description. It is not exhaustive and does not limit embodiments of the invention to the precise forms disclosed. Modifications and variations are possible in light of the above teachings or may be acquired from the practicing embodiments consistent with the invention. For example, some of the figures relate to record selection interfaces for product records. However, other embodiments may relate to non-product records, such as customer records, employee records, transaction records, sales records, and so on. Thus, embodiments of the invention may be used with any record type and the invention is not limited to product records. Additionally, although aspects of the present invention are described as being stored in a memory device, this may include other computer readable media, such as secondary storage devices, for example, hard disks, floppy disks, or CD ROM; the Internet or other propagation medium; or other forms of RAM or ROM.

We claim:

1. A method comprising:
    embedding a preset navigator activation arrangement in a record selection interface of an application, the activation arrangement instantiating, responsive to an activation, a preset navigator interface pane to limit records eligible for display in the record selection interface;
    generating a list of user customized filters, each filter including at least one user selected criterion for at least one user selected data field of the records to initially identify those records and fields eligible for display in the record selection interface when a respective filter is selected from the list of filters;
    identifying a data field of the initially eligible records containing parental relationship information according to the following:
        determining whether an external lookup table defining a parent-child relationship for the initially eligible records exists;
        when the external lookup table exists:
            comparing the data fields of the initially eligible records to those included in the external lookup table; and
            determining the parent-child relationship for the initially eligible records from the parent-child relationship specified in the lookup table;
        when the external lookup table does not exist:
            identifying at least one parent-child field in the initially eligible records defining the parent-child relationship between two of the records;
            comparing information in the identified at least one parent-child field of the initially eligible records; and
            determining the parent-child relationship for the initially eligible records from the compared information;
    generating a tree structure depicting a hierarchical parental relationship between the initially eligible records from the determined parent-child relationship for the initially eligible records; and
    responsive to activating a node in the tree structure, displaying for selection those records containing a parental relationship information field value descending from the activated node.

2. The method of claim 1, wherein the record selection interface is instantiated to provide a user interface to designate at least one data record associated with a process.

3. The method of claim 1, wherein the preset navigator activation arrangement includes a button that is embedded in the record selection interface and is activated through an interaction with the button.

4. The method of claim 1, wherein, responsive to the activation of the activation arrangement, the record selection interface is regenerated on a display screen to accommodate the preset navigator interface pane, which is displayed within the record selection interface.

5. The method of claim 1, wherein the preset navigator interface pane is displayed in a separate window from the record selection interface.

6. The method of claim 4, wherein the record selection interface includes a demarcation arrangement enabling a designation of individual records displayed in the record selection interface for inclusion in a results table.

7. The method of claim 2, wherein the record selection interface includes a demarcation arrangement enabling a designation of individual records displayed in the record selection interface for exclusion from the process.

8. The method of claim 4, further comprising:
comparing data field identifiers included as part of saved search criteria in each filter in the list of filters to each data field included in the initially eligible records;
identifying those filters having data field identifiers matching at least one data field in the initially eligible records; and
including the identified filters in the generated list of filters.

9. The method of claim 8, wherein only those filters having each data field identifier matching at least one data field in the initially eligible records are included in the generated list of filters.

10. The method claim 8, wherein the displaying for selection those records satisfying the search criterion of the selected filter includes applying the search criterion in the selected filter to the initially eligible records to identify those records satisfying the search criterion and limiting the displayed records in the record selection interface to those records satisfying the search criterion.

11. The method of claim 1, wherein the tree structure visually depicts a hierarchical categorization of initially eligible records including a plurality of hierarchical levels based on data field values in the identified data field containing parental relationship information.

12. The method of claim 11, wherein the data field containing parental relationship information includes an identifier through which the data field is identified as containing parental relationship information.

13. The method of claim 12, wherein a data field value in the identified data field containing parental relationship information is compared to an external lookup table to identify an immediate relative in the hierarchical relationship.

14. The method of claim 1, further comprising responsive to activating the node in the tree structure and activating the filter, displaying for selection those records: (1) satisfying the search criterion of the activated filter, and (2) containing a parental relationship information field value descending from the activated node.

15. The method of claim 1, further comprising responsive to activating a second node in the tree structure, displaying for selection those records containing a parental relationship information field value descending from at least one of the activated nodes.

16. The method of claim 1, further comprising responsive to deactivating a node in the tree structure, displaying for selection those records that do not contain a parental relationship information field value descending from the deactivated node.

17. The method of claim 1, further comprising responsive to activating a plurality of filters, displaying for selection those records satisfying the search criterion in each of the selected filters.

18. A memory device comprising stored instructions that, when executed by a processing device, cause the processing device to:
embed a preset navigator activation arrangement in a record selection interface of an application, the activation arrangement instantiating, responsive to an activation, a preset navigator interface pane to limit records eligible for display in the record selection interface;
generate a list of user customized filters, each filter including at least one user selected criterion for at least one user selected data field of the records to initially identify those records and fields eligible for display in the record selection interface when a respective filter is selected from the list of filters;
identify a data field of the initially eligible records containing parental relationship information according to the following;
determining whether an external lookup table defining a parent-child relationship for the initially eligible records exists;
when the external lookup table exists:
comparing the data fields of the initially eligible records to those included in the external lookup table; and
determining the parent-child relationship for the initially eligible records from the parent-child relationship specified in the lookup table;
when the external lookup table does not exist:
identifying at least one parent-child field in the initially eligible records defining the parent-child relationship between two of the records;
comparing information in the identified at least one parent-child field of the initially eligible records; and
determining the parent-child relationship for the initially eligible records from the compared information;
generate a tree structure depicting a hierarchical parental relationship between the initially eligible records from the determined parent-child relationship for the initially eligible records; and
responsive to activating a node in the tree structure, display for selection those records containing a parental relationship information field value descending from the activated node.

19. A preset navigator system comprising a processing device and connectivity to an enterprise system storing a plurality of data records and a parental field data system storing parental relationships of different data field values, the preset navigator system configured to:
embed a preset navigator activation arrangement in a record selection interface of an application in the enterprise system, the activation arrangement instantiating, responsive to an activation, a preset navigator interface pane to limit records in the enterprise system eligible for display in the record selection interface;
generate a list of user customized filters, each filter including at least one user selected criterion for at least one user selected data field of the records in the enterprise system to initially identify those records and fields eligible for display in the record selection interface when a respective filter is selected from the list of filters;
identify a data field of the initially eligible records in the enterprise system containing parental relationship information using the processing device according to the following:
determining whether an external lookup table defining a parent-child relationship for the initially eligible records exists;
when the external lookup table exists:
comparing the data fields of the initially eligible records to those included in the external lookup table; and
determining the parent-child relationship for the initially eligible records from the parent-child relationship specified in the lookup table;
when the external lookup table does not exist:
identifying at least one parent-child field in the initially eligible records defining the parent-child relationship between two of the records;

comparing information in the identified at least one parent-child field of the initially eligible records; and determining the parent-child relationship for the initially eligible records from the compared information;

generate a tree structure depicting a hierarchical parental relationship between the initially eligible records from the determined parent-child relationship for the initially eligible records;

responsive to activating a node in the tree structure, display for selection those records in the enterprise system containing a parental relationship information field value descending from the activated node.

* * * * *